(12) United States Patent
Li et al.

(10) Patent No.: US 9,135,745 B2
(45) Date of Patent: Sep. 15, 2015

(54) IMAGE PROCESSING METHOD AND SYSTEM USING THE SAME

(71) Applicant: INSTITUTE FOR INFORMATION INDUSTRY, Taipei (TW)

(72) Inventors: Mengtsan Li, Taichung (TW); Juiyang Tsai, Tainan (TW); Augustine Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 78 days.

(21) Appl. No.: 14/078,089

(22) Filed: Nov. 12, 2013

(65) Prior Publication Data
US 2015/0110420 A1    Apr. 23, 2015

(30) Foreign Application Priority Data

Oct. 18, 2013   (TW) .............................. 102137695 A

(51) Int. Cl.
*G06K 9/36* (2006.01)
*G06T 15/20* (2011.01)
*G06T 3/00* (2006.01)

(52) U.S. Cl.
CPC .............. *G06T 15/20* (2013.01); *G06T 3/0043* (2013.01); *G06T 2215/12* (2013.01)

(58) Field of Classification Search
CPC .......... G06K 9/00791; G06K 9/00805; H04N 5/243; H04N 7/18; H04N 7/181; H04N 13/0239; H04N 13/0257; H04N 13/0422; H04N 17/002; B60R 1/00; B60R 1/02; B60R 11/04; B60R 2001/1253; B60R 2300/102; B60R 2300/105; B60R 2300/30; B60R 2300/303; B60R 2300/306; B60R 2300/602; B60R 2300/607; B60R 2300/70; B60R 2300/80; B60R 2300/8093; G06T 3/0062; G06T 3/4038; G06T 7/0018; G06T 7/002; G06T 15/20; G06T 15/205; G06T 2207/10021; G06T 2207/30252; G06T 2210/32; G08G 1/163; G08G 1/166; G08G 1/167; G08G 1/168

See application file for complete search history.

(56) References Cited

U.S. PATENT DOCUMENTS

| 8,576,285 | B2 * | 11/2013 | Gomi et al. ................... | 348/148 |
| 2013/0194256 | A1 * | 8/2013 | Gassmann et al. ............ | 345/419 |
| 2014/0114534 | A1 * | 4/2014 | Zhang et al. ................... | 701/42 |
| 2014/0152778 | A1 * | 6/2014 | Ihlenburg et al. .............. | 348/47 |

FOREIGN PATENT DOCUMENTS

EP    2 511 137 A1    10/2012

OTHER PUBLICATIONS

Kapje Sung, et al. "Development of Image Synthesis Algorithm with Multi-Camera", 978-1-4673-0990-5/12, 2012 IEEE.

* cited by examiner

*Primary Examiner* — Jose Couso
(74) *Attorney, Agent, or Firm* — Li & Cai Intellectual Property (USA) Office

(57) ABSTRACT

An image processing method and system using the same, wherein the image processing method includes capturing a plurality of images corresponding to the surroundings of an object using a plurality of image capturing modules to generate a two-dimension planar image; providing a three-dimension projected curved surface; defining a plurality of first grids on the three-dimension projected curved surface and a plurality of second grids on the two-dimension planar image, wherein each of the first grids correspond to each of the second grids; transforming the first grids on the three-dimension projected curved surface and the second grids on the two-dimension planar image into a plurality of first redrawn grids and second redrawn grids respectively based on the angles formed between the normal vector of the two-dimension planar image and the normal vector of each first grid, wherein each first redrawn grid corresponds to each second redrawn grid.

20 Claims, 14 Drawing Sheets

IMAGE PROCESSING METHOD AND SYSTEM USING THE SAME

BACKGROUND

1. Technical Field

The present disclosure relates to an image processing method; in particular, to an image processing method and system using the same transforming a two-dimensional (2D) image into a three-dimensional (3D) image.

2. Description of Related Art

The imaging driving assistance has developed for years; however, in general, it's via a driving video recorder to capture and display images for the user. It has been helpful, but due to the increasing amount of the driving video recorders it has become a burden for the user to watch a plurality of images displayed on one displayer at the same time. Accordingly, the reconstruction of the Bird's eye view image is developed. The driving assistance system with cameras, using the Bird's eye view images, which configured on the surroundings of the carrier becomes dominating. To be more detailed, via the image transformation and processing, it's able to transform the captured images into Bird's eye view images and then to combine them into a full aerial image provided to the driver for reference, which further enhances the driving safety.

However, currently, the full aerial image transformed from and combined by a plurality of images captured by a plurality of driving recorders still has several defects. Please refer to FIG. 1A and FIG. 1B, FIG. 1A shows a schematic diagram of a traditional automatic vehicle monitoring system (Automatic Vehicle Monitoring, AVM) capturing images via a plurality of image capturing modules. FIG. 1B shows a schematic diagram of an around Bird's-eye view generated by a traditional automatic vehicle monitoring system. For example, as shown in FIG. 1A, there are a plurality of driving video recorders 101~104 configured on the vehicle body 10, wherein the driving video recorders are respectively located at the right side, the front, the left side and the rear of the vehicle body 10. The driving video recorders 101~104 respectively capture a plurality of images of the surroundings of the vehicle body 10. After that, as shown in FIG. 1B, the automatic vehicle monitoring system transforms, processes, and combines the image 101a~104a via a bird's view image transformation to form a full aerial image 11. However, via the automatic vehicle monitoring system, the images captured by the driving video recorders 101~104 are two-dimension planar images, and thus images of the objects on the road (such as passengers, trees, or blocks which have actual heights, would be distorted during the image transformation. Therefore, even via a full aerial image 11 of the surroundings of the vehicle body 10, the driver is still unable to accurately evaluate the distance between the vehicle body 10 and the objects having actual heights on the road. Under this circumstance, as a driver is going to stop his car, it's likely to result in accidents because of mistakes. In short, there are still problems left to be solved when it comes to the imaging driving assistance.

SUMMARY

The present disclosure provides an image processing method, comprising the following steps. First, capturing a plurality of images of the surroundings of an object using a plurality of image capturing modules to generate a two-dimension planar image. Secondly, providing a three-dimension projected curved surface, providing a three-dimension projected curved surface, defining a plurality of first grids on the three-dimension projected curved surface and a plurality of second grids on the two-dimension planar image, wherein each of the first grids corresponds to each of the second grids. Further, transforming the first grids on the three-dimension projected curved surface and the second grids on the two-dimension planar image into a plurality of first redrawn grids and second redrawn grids respectively based on the angles formed between the normal vector of the two-dimension planar image and the normal vector of each first grid, wherein each first redrawn grid corresponds to each second redrawn grid. After that, projecting an image data of the second redrawn grids onto the first redrawn grids correspondingly to generate a three-dimension image.

The present disclosure provides a system applying the image processing method, comprising a plurality of image capturing modules and an image processing module. The image capturing modules is to capture a plurality of images of the surroundings of an object. The image processing module is to transform an image data with the image capturing modules. The image processing module further comprises an image reconstruction unit, a computing unit, and a projective transformation unit. The image reconstruction unit is coupled to the image capturing modules, the computing unit is coupled to the image reconstruction unit, and the projective transformation unit is coupled to the computing unit. The image reconstruction unit is to receive the images and correspondingly generating a two-dimension planar image. The computing unit is to respectively and correspondingly draw a three-dimension projected curved surface and the two-dimension planar image into a plurality of first girds and a plurality of second grids, and each second grid is corresponded to each first grid. The computing unit is to draw the three-dimension projected curved surface and the first grids and the second grids of the two-dimension planar image into a plurality of first redrawn grids and a plurality of second redrawn grids based on the angles between a first normal vector of the two-dimension planar image and a second normal vector of each first grid, and each first redrawn grid corresponds to each second redrawn grid. The projective transformation unit is to correspondingly project the image data in the second redrawn grid onto the first redrawn grids to generate a three-dimension image.

Accordingly, via the image processing method and system using the same provided by the present disclosure, it's able to dynamically adjust the grid drawing algorithm during the projective transformation process adaptively according to the different used three-dimension projected models regarding to different needs for images, and able to precisely transform a two-dimension image into a three-dimension image, in order to improve the visual effect provided by the prior art and also the time consumption of computing. The image processing method and system using the same provided by the present disclosure is able to replace the prior art via the improved computing process under the current two-dimension image monitoring system framework without changing the current hardware framework or additionally having certain hardware facilities. Also, the present disclosure is able to effectively improve the image distortion of the image monitoring system for the vehicle safety, housing security or other surrounding images.

In order to further the understanding regarding the present disclosure, the following embodiments are provided along with illustrations to facilitate the disclosure of the present disclosure.

BRIEF DESCRIPTION OF THE DRAWINGS

FIGS. 6-1 and 6-2 show flow charts of a grid merging sub-algorithm of an image processing method according to an embodiment of the present disclosure;

DETAILED DESCRIPTION OF PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 2:
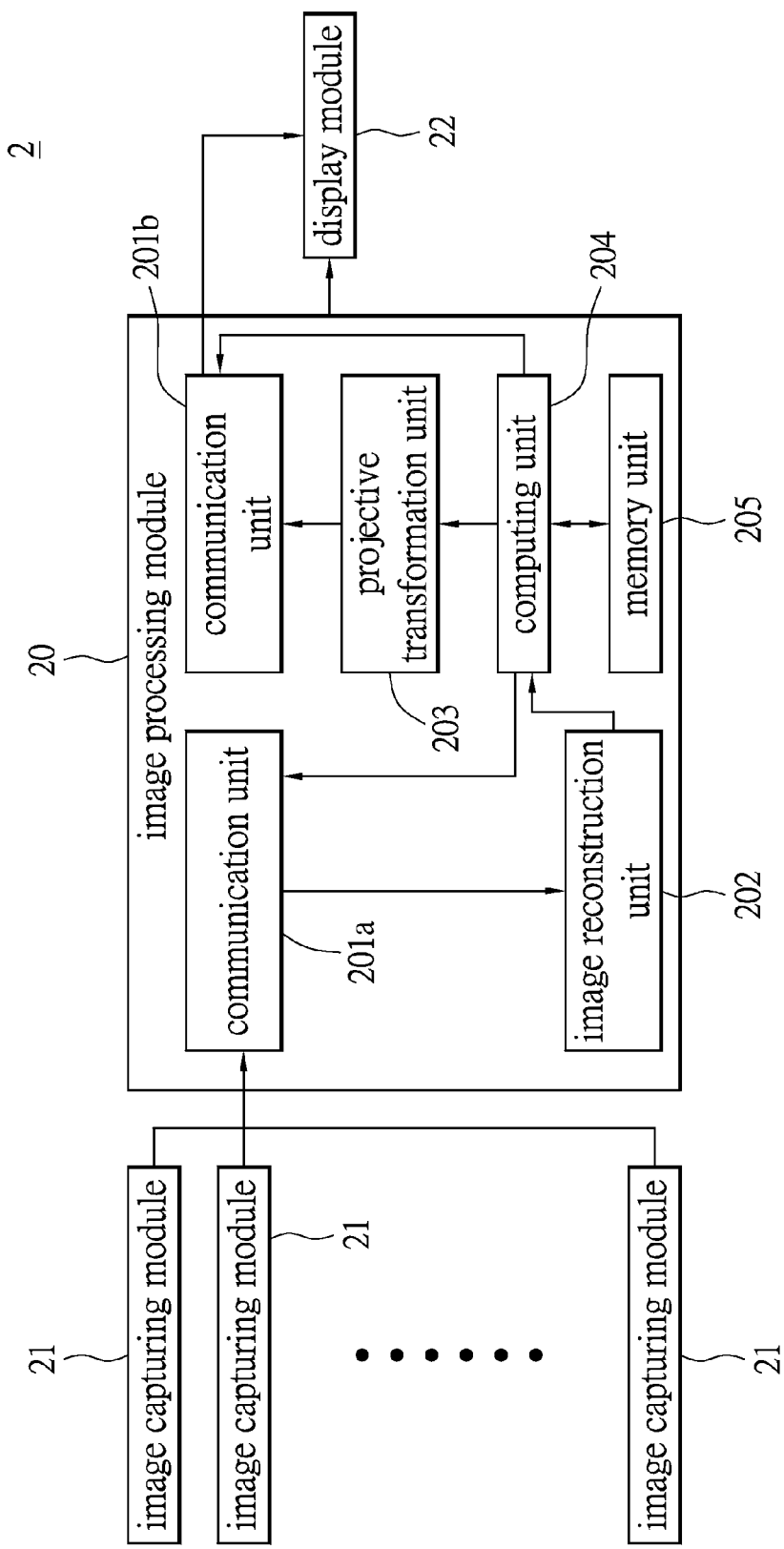
FIG. 2 shows a block diagram of an image processing system according to an embodiment of the present disclosure.

Please refer to FIG. 2, FIG. 2 shows a block diagram of an image processing system according to an embodiment of the present disclosure. An image processing system 2 comprises a plurality of image capturing modules 21, an image processing module 20 and a display module 22. The image processing module 20 is to capture images captured by the image capturing module 21, and to transfer the captured images to the display module 22 after processing.

The image processing system 2 is able to be applied in every surroundings that needs to be monitored, such as monitoring when driving, in a neighboring hood, or in a campus, etc. The following embodiments take the monitoring when driving for example, but the present disclosure is not restricted thereto.

The image capturing module 21 is able to be configured according to needs of the user, and to provide a plurality of captured images of the surroundings of an object, wherein the images are two-dimension images. The image capturing module 21 of the present disclosure is configured at different locations on a movable carrier, such as an auto-mobile, in order to capture a plurality of images of the surroundings of the auto-mobile.

Figure 1A:
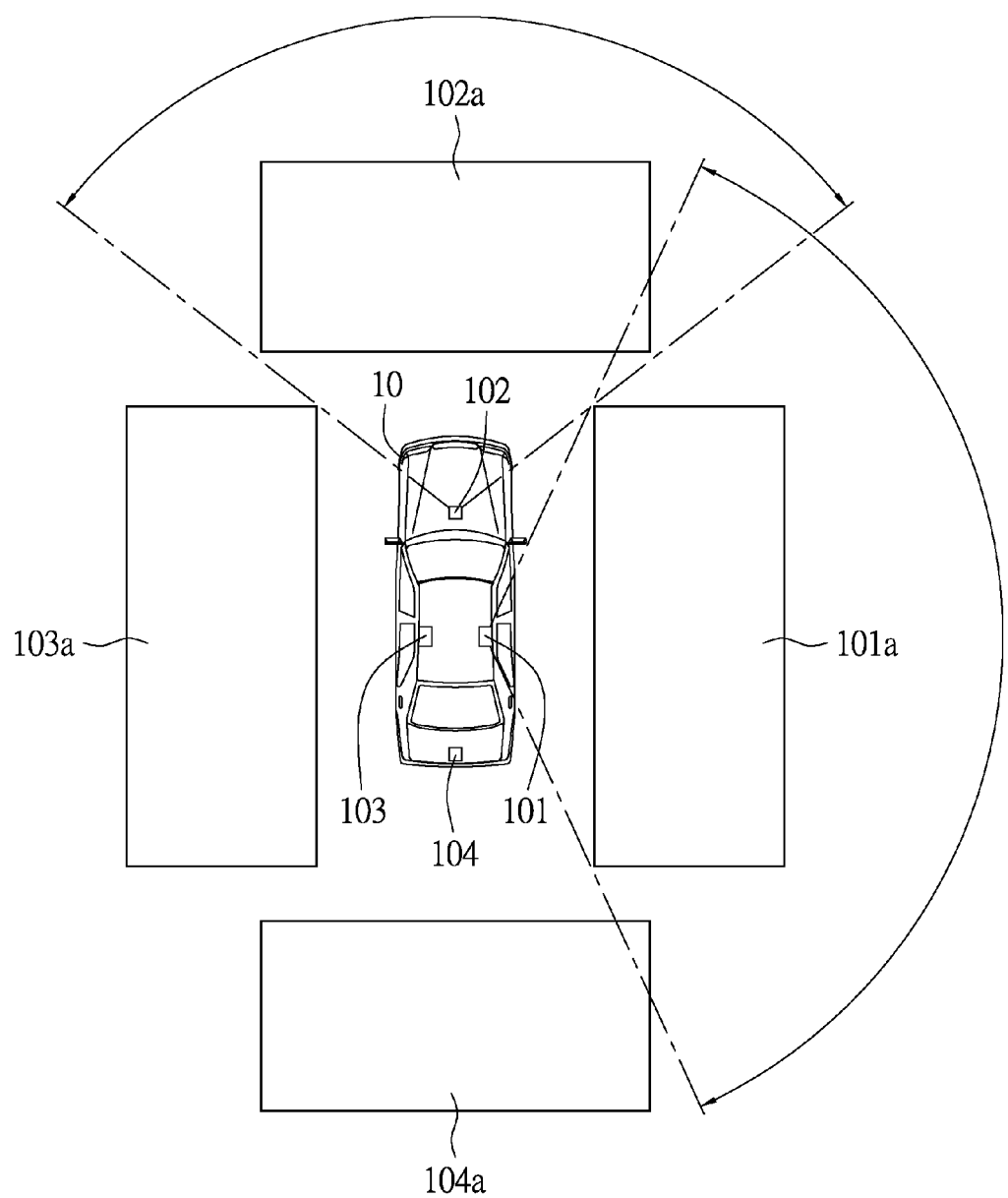
FIG. 1A shows a schematic diagram of a traditional automatic vehicle monitoring system capturing images via a plurality of image capturing modules.
Figure 1B:
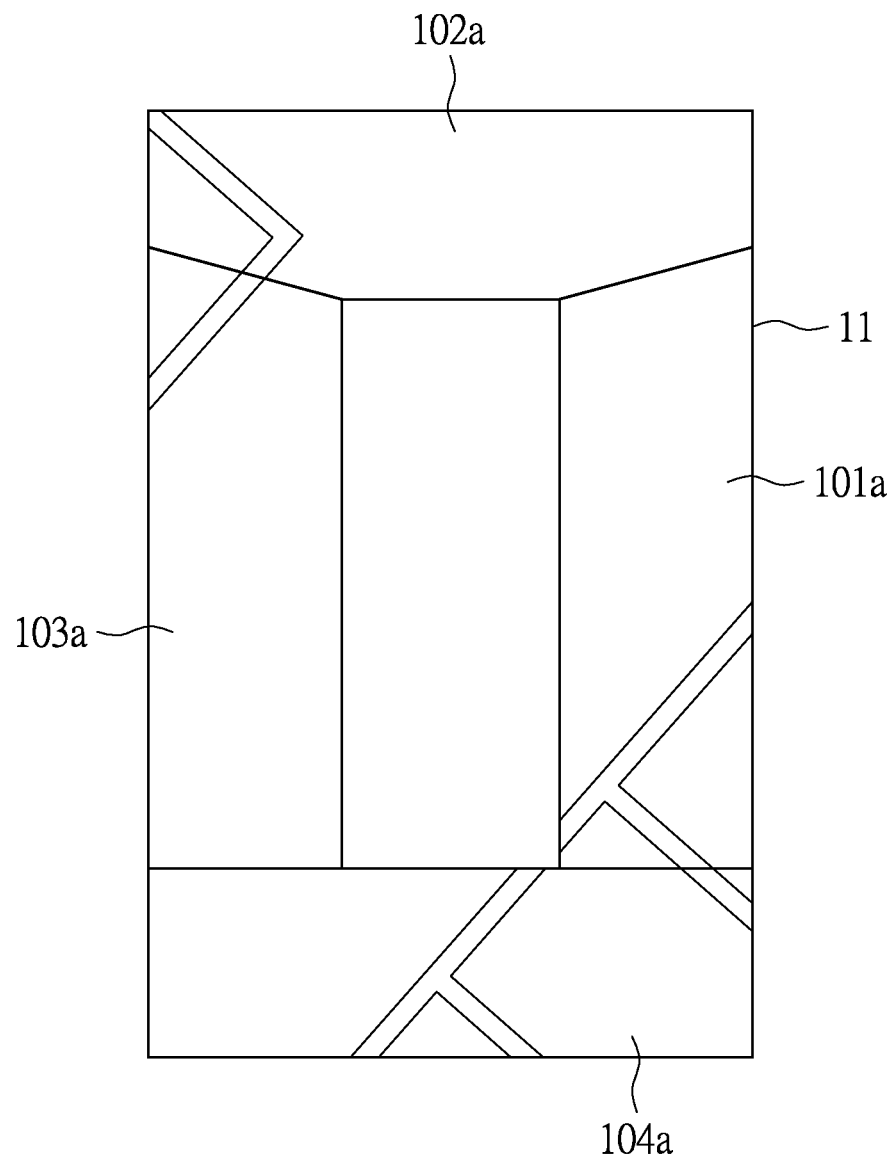
FIG. 1B shows a schematic diagram of an around Bird's eye view generated by a traditional automatic vehicle monitoring system.

The image processing system 2 is applied to a movable carrier. The image capturing module 21, as shown in FIG. 1A, is able to be a plurality of driving video recorders 101~104 respectively located at the right side, the front, the left side and the rear of a vehicle body 10. For example, the driving video recorders 101~104 are able to be configured at the engine hood, the truck lid and the roof of the vehicle body 10, etc, to capture images of the surroundings of the vehicle body 10.

As described above, the image processing system 2 is also able to be used for monitoring in neighborhood, campus or other surroundings. Thus, in other embodiments, as the image processing system 2 is monitoring a neighborhood or a campus, the image capturing module 21 is able to be configured on a building in order to capture the images of the surroundings of the building. In other words, the image capturing module 21 is to capture and provide a plurality of images of the surroundings of an object for analyzing.

The image capturing module 21 is a common video recorder, a driving video recorder, a building monitor, or each image capturing device that the skilled in the art will use for making an equivalent change to the present disclosure, and it's not restricted thereto.

The image processing module 20 comprises communication units 201a and 201b, an image reconstruction unit 202, a projective transformation unit 203, a computing unit 204 and a memory unit 205. The communication unit 201, the image reconstruction unit 202, the projective transformation unit 203, and the memory unit 205 are respectively coupled to the computing unit 204. The image reconstruction unit 202 is coupled to the communication unit 201a. The memory unit 205 is coupled to the computing unit 204. The projective transformation unit 203 is coupled to the computing unit 204 and the communication unit 201b.

The image processing module is to capture a plurality of images captured by the image capturing module 21, and to process the received images in order to combine the images into a three-dimension image, such as an around Bird's-eye view.

The communication unit 201a is able to implement a wire transmission or a wireless transmission, providing the received images for the image processing module 20. The communication unit 201b is able to implement a wire transmission or a wireless transmission, and is provided to transmit the images from the projective transformation unit 203 to the display module 22. For example, in one embodiment of the present disclosure, the image capturing module 21 has a wire communication unit (not illustrated) able to be connected to the communication unit 201a of the image processing module 20, for example, via a USB communication interface, and transmit the captured images to the image processing module 20. In another embodiment of the present disclosure, the image capturing module 21 even has a wireless communication unit (not illustrated) able to transmit data to the image processing module 20, and to transmit a plurality of received images to the image processing module 20. Thus, the transmission type, wire one or wireless one, is not restricted by the present disclosure.

The image reconstruction unit 202 is to process a plurality of images received by the communication unit 201a, and to combine the images into a two-dimension planar image via an image stitching and reconstruction technology, wherein the two-dimension planar image is provided for the image processing module 20 to proceed with an image processing. The image reconstruction unit 202 is able to be a computing cell capable of processing images or computing, and the skilled in the art will appreciate how to make an equivalent change to the present disclosure after reading the disclosure of this specification. The present disclosure isn't limited thereto.

The image processing described above comprises the grayscale converting, the image enhancement, the filter processing, the image binarization, the edge capturing, the feature region positioning, the feature extracting and the image compression or the like.

The computing unit 204 is a computing core of the image processing module 20. The computing unit 204 is able to define a plurality of model parameters to build a three-dimension projected model according to the two-dimension planar image. It's worth mentioning that the three-dimension projected curved surface able to be generated via any three-dimension projected model and it's not restricted thereto.

The computing unit 204 is further to implement a plurality of computing programs, such as the initialization program, gridizing algorithm, the grid adaption program, the grid drawing sub-algorithm, the grid merging sub-algorithm, and the like. Also, the computing unit 204 is to control the communication unit 201 to receive or transmit image data such that the data transmission is taken between the image processing module 20, the image capturing module 21, or the display module 22. The above computing programs are going to be described in the following embodiments, and thus the redundant information is not repeated.

The projective transformation unit is to receive an image result generated from a plurality of computing programs implemented by the computing unit 204, to project a two-dimension planar image onto a three-dimension projected curved surface, and generate a three-dimension image. For example, the second grid of the two-dimension planar image is projected onto the first grid of the three-dimension projected curved surface. Additionally, the projective transformation unit 203 is able to be a computing cell capable of processing images or computing, and the skilled in the art will appreciate how to make an equivalent change to the present disclosure after reading the disclosure of this specification.

The memory unit 205 is to store data needed to be stored during the computation, such as a two-dimension planar image data generated by the image reconstruction unit 202 and a three-dimension projected curved surface generated by the computing unit 204 based on the two-dimension planar image. After that, the two-dimension planar image data and the three-dimension projected curved surface data are stored in the memory unit 205 by the computing unit 204 for the convenience of preceding the gridizing algorithm or the like. Moreover, a plurality of three-dimension projected models are able to be stored in advance in the memory unit 205 to provide for the computing unit 204 choosing to directly generate a three-dimension projected curved surface. The three-dimension projected curved surface is not always necessarily generated based on the two-dimension planar image, and it's not restricted by the present disclosure thereto.

The image reconstruction unit 202, the computing unit 204, and the projective transformation unit 203 are able to be firmware designs via processing chips such as a microcontroller or an embedded controller. The memory unit 205 in this embodiment is a flash memory chip, a read only memory chip, a random access memory chip, or other volatile memory chips and nonvolatile memory chips, which is not restricted by the present disclosure thereto.

The display module 22 is to display a three-dimension image. More precisely, the display module 22 is to provide for a user a three-dimension image that generated by a plurality of images which are captured by the image capturing module 21 and then processed. In one embodiment of the present disclosure, the display module 22 has a wire communication unit (not illustrated) able to be connected to the communication unit 201b and to receive the three-dimension image. In another embodiment of the present embodiment, the display module 22 has a wireless communication unit (not illustrated), and thus the display module 22 is further able to transmit data to the communication unit 201b of the image processing module 20, to be connected to the communication unit 201b wirelessly, and to receive the three-dimension image. Thus, the transmission type, wire one or wireless one, is not restricted by the present disclosure. The display module 22 is able to be an image displayer.

In short, in the image processing system 2 of the present disclosure, first, a plurality of images of the surroundings of a corresponding object are captured and then provided by the image capturing module 21. Further, the image processing module 20 is to receive and process the images in order to combine the images into a three-dimension image that is later transmitted to the image module 22 for displaying.

To be more detailed, the image reconstruction unit 202 of the image processing module 20 receives the images and combines them into a two-dimension planar image. After that, the two-dimension planar image is provided to the computing unit 204 to be processed.

The computing unit 24 orderly implements the initialization program, the gridizing algorithm, the grid adaption program, the grid drawing sub-algorithm, and the grid merging sub-algorithm. The computing unit 24 generates a three-dimension projected curved surface according to the two-dimension planar image. The gridizing algorithm is to respectively and correspondingly draw the three-dimension projected curved surface and the two-dimension planar image into a plurality of first grids and a plurality of second grids, wherein the amount of the second grids is equal to the amount of the first grids. The grid adaption program is to adapt the corresponding locations of the three-dimension projected curved surface and the two-dimension planar image in order to make the center of the three-dimension projected curved surface be corresponded to the center of the two-dimension planar image and to make each first grid is corresponded to each second grid. The grid drawing sub-algorithm and the grid merging sub-algorithm is to redraw the first grids and the second grids of the three-dimension projected curved surface and the two-dimension planar image into a plurality of first redrawn grids and a plurality of second redrawn grids according to the degree of the angles between the normal vector of the two-dimension planar image and the normal vector of each first grid, wherein each first redrawn grid is corresponded to each second redrawn grid.

After that, the projective transformation unit 203 is to project the image data in each second redrawn grid onto the corresponding first redrawn grid in order to generate the three-dimension image. Finally, the image processing module 20 combines the images into the three-dimension image and then transmits the three-dimension image to the image module 22 for displaying.

Figure 3A:
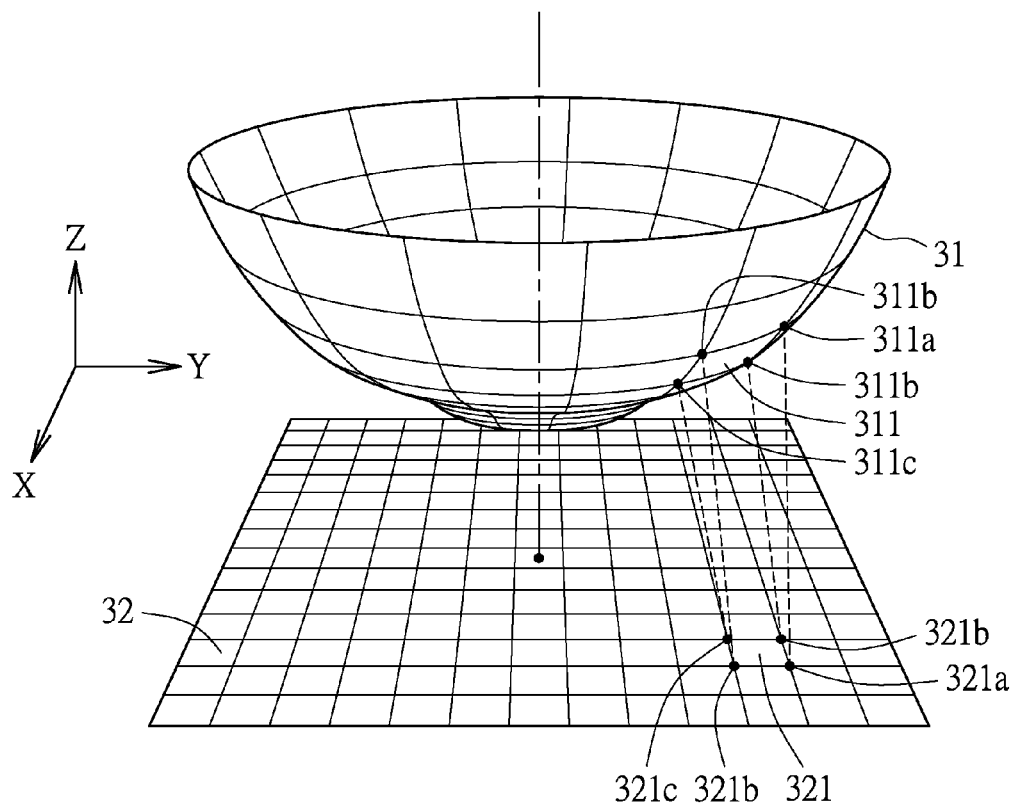
FIG. 3A shows a schematic diagram of a transformation between a two-dimension planar image and a three-dimension projected curved surface according to an embodiment of the present disclosure.
Figure 3B:
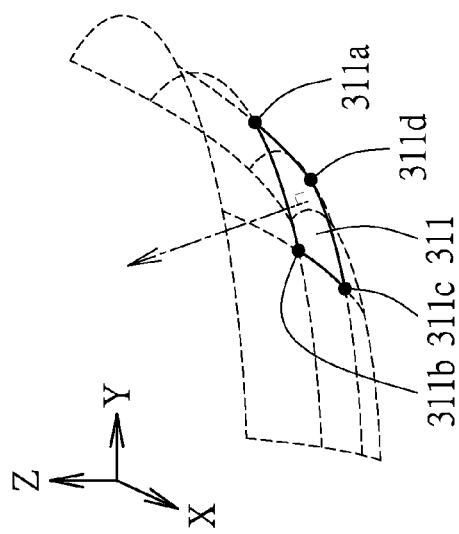
FIG. 3B shows a schematic diagram of the relative locations of the first grids according to an embodiment of the present disclosure.
Figure 3C:
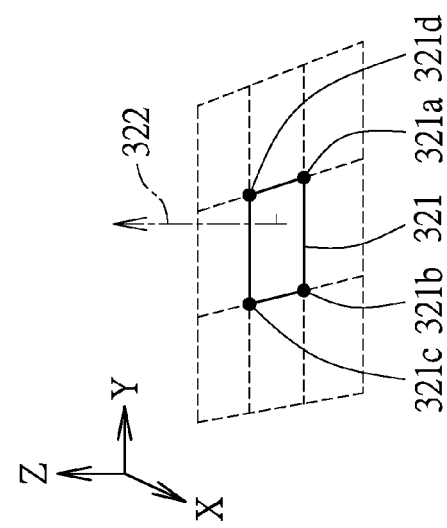
FIG. 3C shows a schematic diagram of the relative locations of the second grids according to an embodiment of the present disclosure.
Figure 3D:
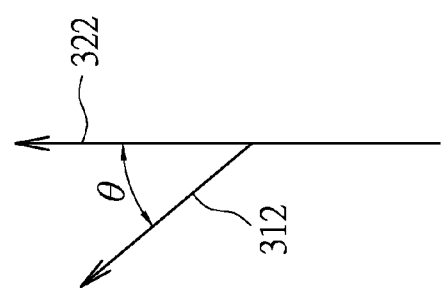
FIG. 3D shows a schematic diagram of an angle between the normal vectors of the first grid and the second grid according to an embodiment of the present disclosure.
Figure 4:
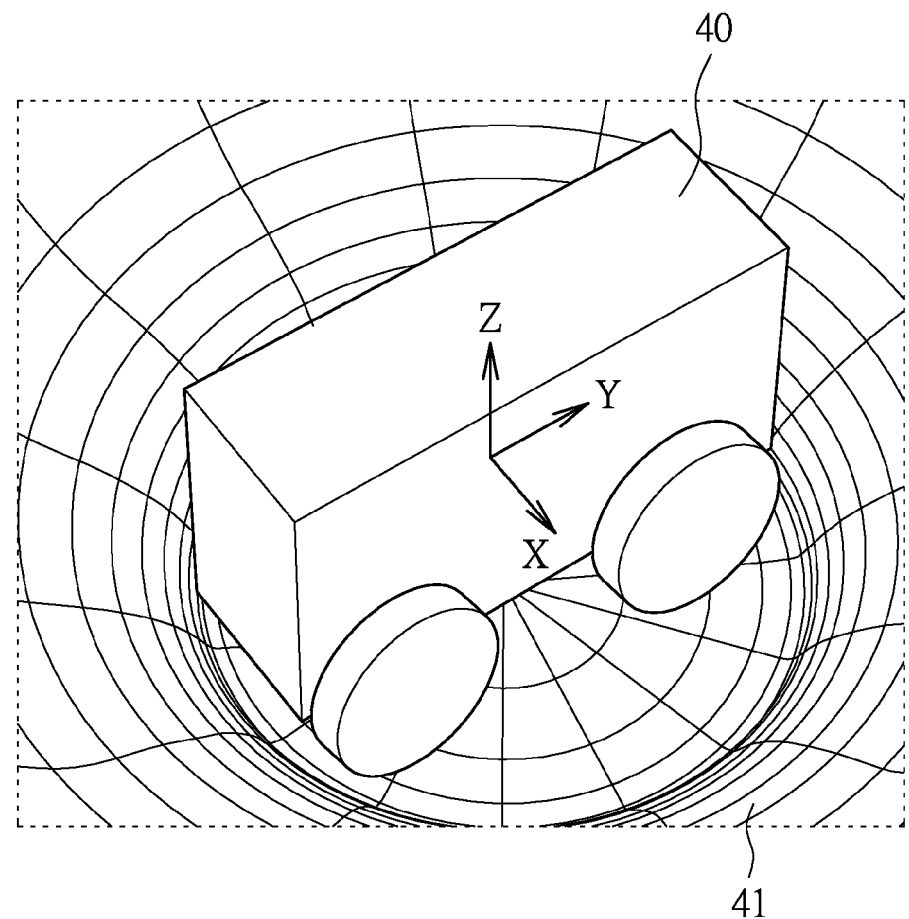
FIG. 4 shows a location schematic diagram of a three-dimension projected curved surface according to an embodiment of the present disclosure.
Figure 5:
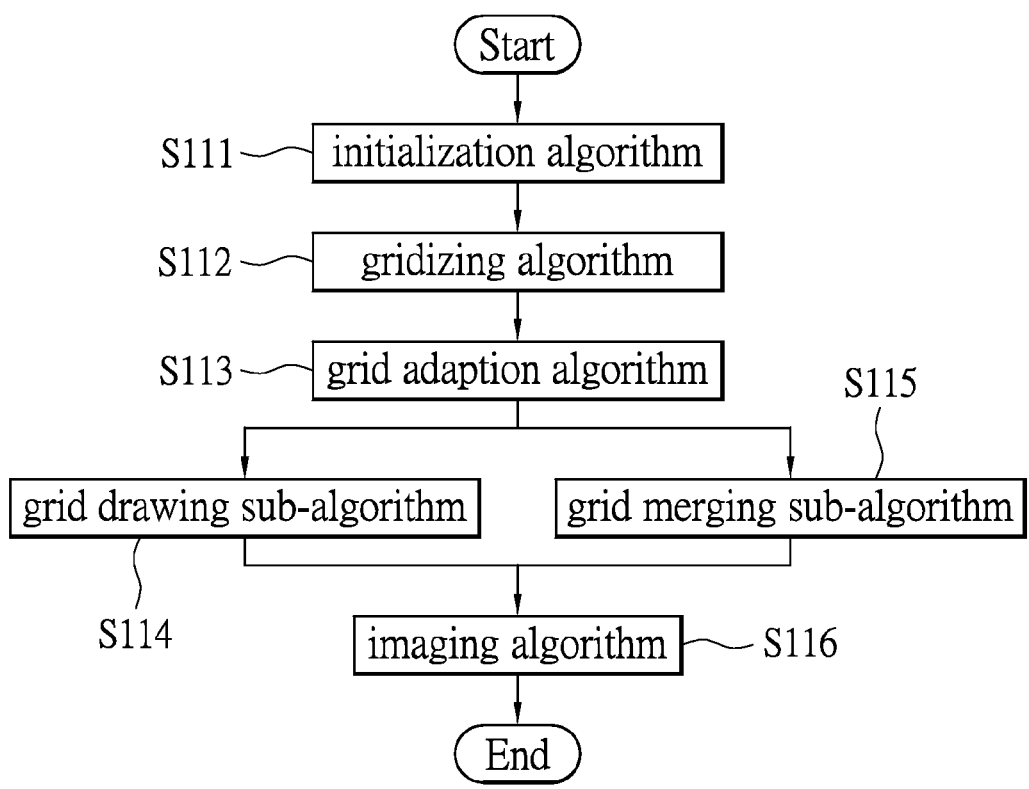
FIG. 5 shows a flow chart of an image processing method according to an embodiment of the present disclosure.

In order to conveniently describe the embodiment of the image processing method, please refer to FIG. 2, FIGS. 3A~3D, FIG. 4 and FIG. 5. FIG. 3 shows a schematic diagram of a transformation between a two-dimension planar image and a three-dimension projected curved surface according to an embodiment of the present disclosure; FIG. 3B is a schematic diagram of the relative locations of the first grids according to an embodiment of the present disclosure; FIG. 3C is a schematic diagram of the relative locations of the second grids according to an embodiment of the present disclosure; FIG. 3D is a schematic diagram of an angle between the normal vectors of the first grid and the second grid according to an embodiment of the present disclosure; FIG. 4 is a location schematic diagram of a three-dimension projected curved surface according to an embodiment of the present disclosure; and FIG. 5 is a flow chart of an image processing method according to an embodiment of the present disclosure. The embodiment of the image processing method of the present disclosure comprises an initialization program S111, a gridizing algorithm S112, a grid adaption program S113, a grid drawing sub-algorithm S114, a grid merging sub-algorithm S115 and an imaging program S116.

Please also refer to FIG. 3A and FIG. 4. In the initialization program S111, the initialization program implemented by the computing unit 204 is to generate a three-dimension projected curved surface 31 according to the two-dimension planar image 32. In other words, after receiving the two-dimension planar image 32, the computing unit 204 further generates a three-dimension projected curved surface 31 of which the projected area is smaller than the projected area of the two-dimension planar image 32, according to the two-dimension planar image 32. However, the three-dimension projected curved surface 31 is also able to be directly generated and used based on a three-dimension projected model chosen from the three-dimension projected models previously stored in the memory unit 205, and thus it's not restricted thereto by the present disclosure.

In the embodiment of the present disclosure, the three-dimension projected curved surface 31 is generated based on the two-dimension planar image 32, and this three-dimension projected curved surface 31 is described and implemented as a bowl-shaped projected object (as described above it's comprised of a planar bottom and a disclosed curved surface 41). While in other embodiments of the present disclosure, it's also able to be a closed curved surface 41, concave upward and outward, having the vehicle body 40 or other monitoring system and device as a center. The planar bottom shows the location of the vehicle body 40. The height of the three-dimension projected curved surface 31 is generated from a three-dimension projected model, and the three-dimension projected model has to satisfy with the spatial condition shown as the formula $Z \propto \sqrt{X^2+Y^2}$, wherein X, Y, Z are axes of the three-dimension space.

In the gridizing algorithm S112, the computing unit 204 respectively and correspondingly redraws the three-dimension projected curved surface 31 and the two-dimension planar image 32 into a plurality of first grids 311 and a plurality of second grids 321, wherein the amount of the second grids 321 is equal to the amount of the first grids 311. In the embodiments of the present disclosure, merely the quadrilateral grid is described, while the skilled in the art will appreciate how to replace the quadrilateral grid with the triangular grid or the gird having other shapes and thus it's not restricted thereto by the present disclosure.

Further, in the grid adaption program S113, the computing unit 204 adapts the corresponding locations of the three-dimension projected curved surface 31 and the two-dimension planar image 32 in order to make the center of the three-dimension projected curved surface 31 be corresponded to the center of the two-dimension planar image 32 and to make each first grid is corresponded to each second grid. Besides, the computing unit 204 is able to adapt the three-dimension projected curved surface 31 such that the normal projected area of the three-dimension projected curved surface 31 is able to be completely covered by the normal projected area of the two-dimension planar image 32.

After the grid adaption program S113 is implemented by the computing unit 204, the grid redrawing program is going to be proceeded, such as the grid drawing sub-algorithm S114 and the grid merging sub-algorithm S115. The grid drawing sub-algorithm S114 and the grid merging sub-algorithm S115 are to redraw the first grids 311 and the second grids 321 of the three-dimension projected curved surface 31 and the two-dimension planar image 32 according to the degree of the angles ∠θ between the normal vector of the two-dimension planar image 32 and the normal vectors of each first grid.

Figures 1, 6:
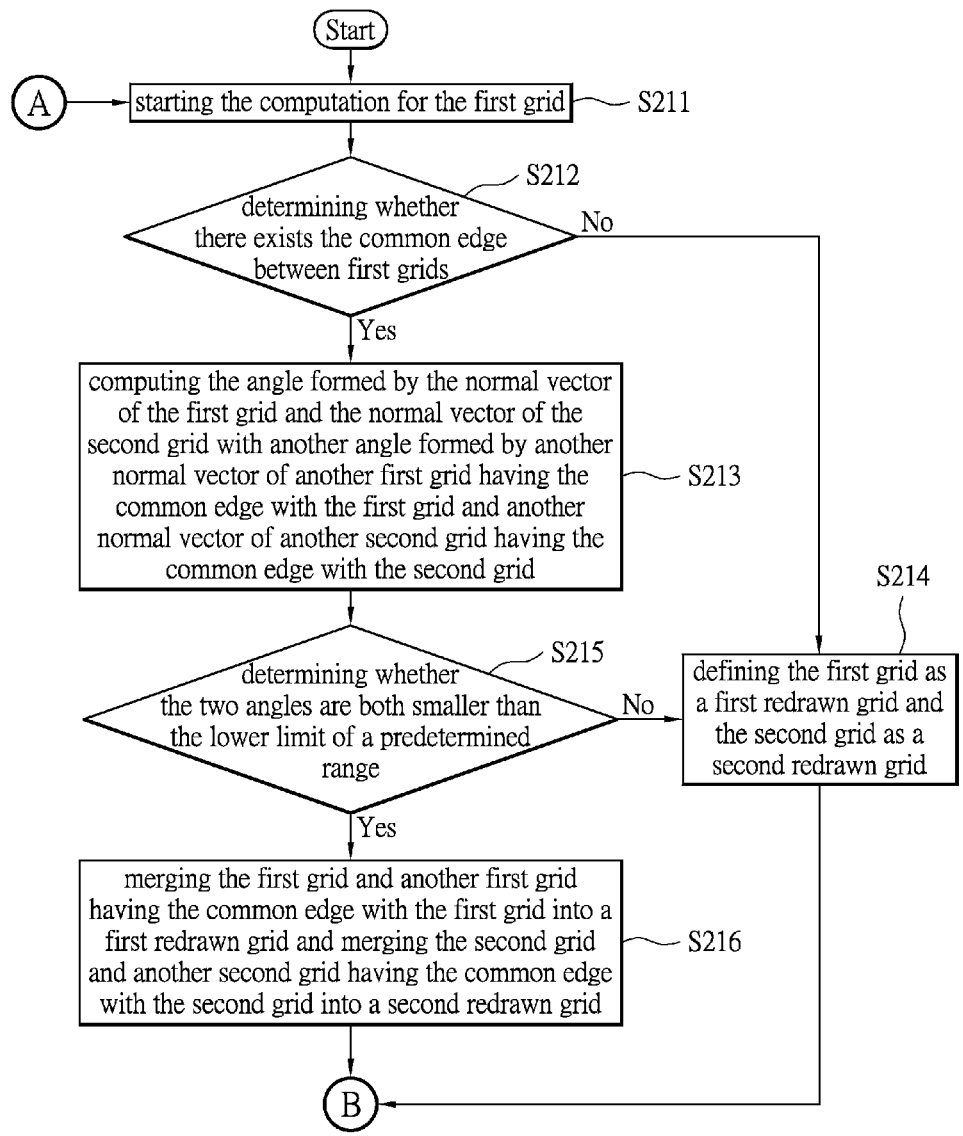
Figures 2, 6:
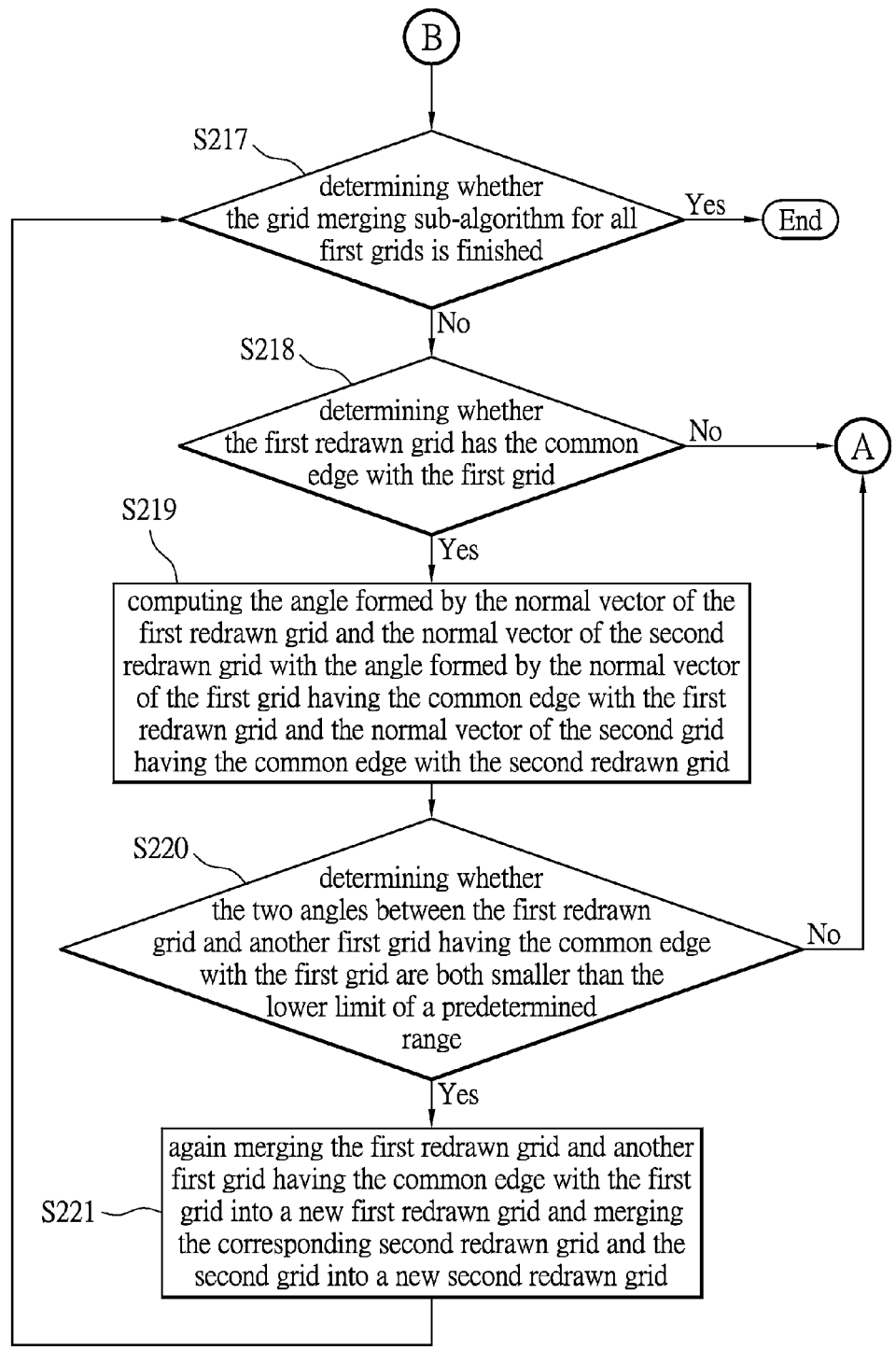

Please refer to FIG. 6-1 and FIG. 6-2. FIG. 6-1 and FIG. 6-2 show flow charts of a grid merging sub-algorithm of an image processing method according to an embodiment of the present disclosure. To be more precise, in the embodiment of the image processing method of the present disclosure, after finishing the grid adaption program S113, it's able to choose the grid merging sub-algorithm S115 to proceed, wherein the grid merging sub-algorithm S115 further comprises a plurality of steps S211~S221.

Figure 7A:
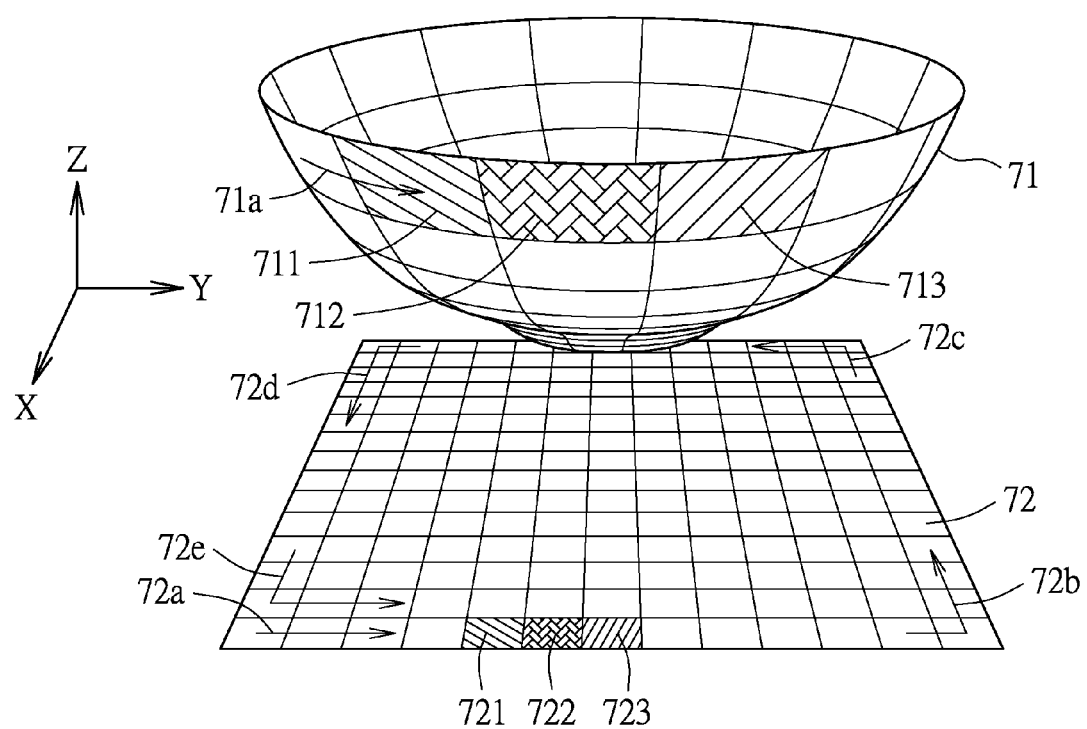
FIG. 7A~7C show schematic diagrams of a grid merging sub-algorithm in an image processing method according to an embodiment of the present disclosure.
Figure 7B:
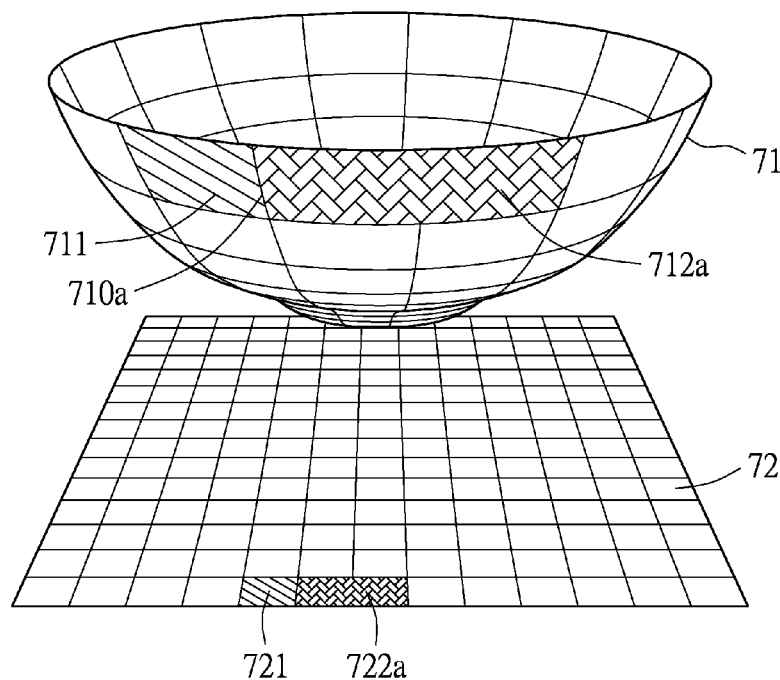
Figure 7C:
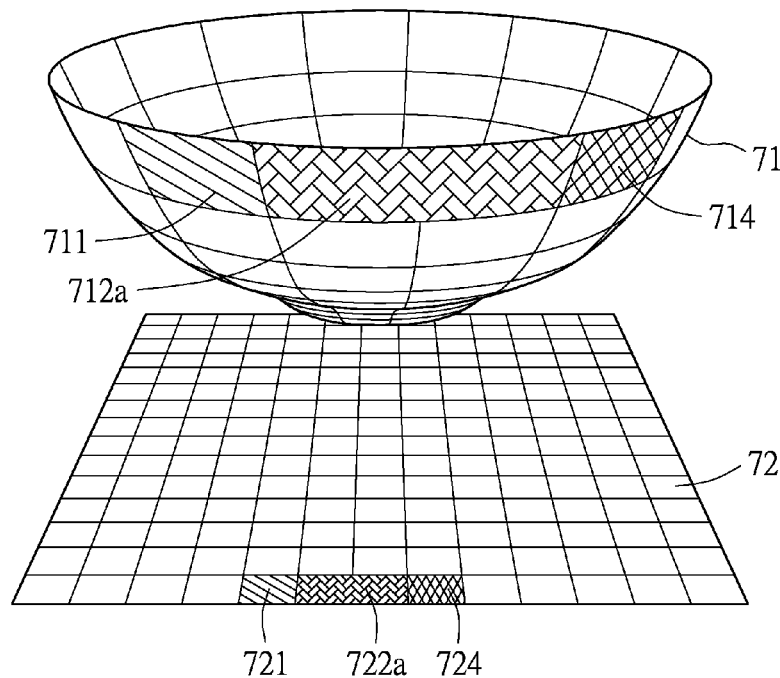

Please refer to FIG. 6-1, 6-2 and FIGS. 7A~7C. FIGS. 7A~7C shows schematic diagrams of a grid merging sub-algorithm of an image processing method according to an embodiment of the present disclosure. The first grids 711~713 of the three-dimension projected curved surface 71 are respectively corresponded to the second grids 721~723 of the two-dimension planar image 32. In the step S211, the computing unit 204 starts the computation of the grid merging from the three-dimension projected curved surface 71 (the computation is also able to start from the two-dimension planar image 72 and it's not restricted thereto by the present disclosure). In the embodiment of the present disclosure, the computation is able to be implemented by the computing unit 204 via scanning spirally from the inside to the outside of the grids of the three-dimension projected curved surface. Additionally, it's also able to scan longitudinally or transversely in order. For example, FIG. 7A shows the computation starting from the most outer first grid 711 toward the first grids 712, 713 and so on. More precisely, the direction of spirally scanning starts along the corresponding directions 72a~72e, from the outside to the inside, and from the first grid 711.

Further, in the Step S212, the computing unit 204 determines whether, toward to the direction 71a, there are first grids having common edge. The example in FIG. 7A shows that, if the first grid 711 and the first grid 712 do not share common edge, and then the computing unit 204 proceeds to the Step S214, on the other hand, if the first grid 711 and the first grid 712 share common edge, and then the computing unit 204 proceeds to the Step 213.

In the Step S214, the computing unit 204 defines the first grid having no common edge 711a or not satisfied with the predetermined condition (as described below) as a first redrawn grid; meanwhile, the computing unit 204 defines the second grid 721 as a second redrawn grid. To be concrete, as shown in FIG. 7, the first grid 711 is redrawn as the first redrawn gird once after computing, and after finishing the redrawing of the first grid 711, the computing unit 204 proceeds to the Step S217.

In the Step S213, please refer to FIG. three-dimension again, the computing unit 204 further proceeds to compute for the first grid 711 and the first grid 712 having common edge 711a. The computing unit 204 computes the angle ∠θ (shown as θ in FIG. three-dimension) between the normal vector of the first grid 711 (shown as the normal vector 312 in FIG. 3B)

and the normal vector of the second grid (shown as the normal vector 322 in FIG. 3C), and another angle ∠θ between the normal vector of the first grid 712 having common edge 711a and the normal vector of the second grid 722.

It's worth noting that, as known, there are two angles ∠θ and 180°−∠θ formed depending on the chosen directions of the normal vectors of the first grid and the second grid. Thus, in other embodiments of the present disclosure, the above ∠θ is also able to be obtained by computing the angle between the inverse vector of the normal vector of the first grid 712 and the normal vector of the second grid 722, wherein 180° minus the computed angle leaves ∠θ.

After obtaining two angles (for example, the angles respectively between the first grids 711 and 712 and the second grids 721 and 722), in the Step S215, it proceeds to determine whether the two angles ∠θ are satisfied with the determined condition. The predetermined condition is being smaller than the lower limit of a predetermined range. More precisely, the computing unit 204 determines whether the two angles ∠θ are smaller than the lower limit of the predetermined range. If they are, it proceeds to the Step S216, on the other hand, if they are not, it proceeds to the Step S214. In other words, if the two angles are within a predetermined range 30°~60°, and then the computing unit 204 determines not to implement the grid merging sub-algorithm and directly defines the first grid 711 as a first redrawn grid and the second grid as a second redrawn grid.

It's worth mentioning that the predetermined condition is able to be being smaller than a predetermined value. The predetermined value, for example, is a real value 45°. It's to determine whether the two angles ∠θ are both smaller than 45°. If the two angles ∠θ are smaller than 45°, and then it proceeds to the Step S216, on the other hand, if one of the two angles is not smaller than 45°, it proceeds to the Step S214. In other words, if the two angles ∠θ are both equal to 45°, and then the computing unit 204 determines not to proceed to the grid merging sub-algorithm and directly defines the first grid 711 as a first redrawn grid and the second grid 721 as a second redrawn grid.

In the Step S216, the computing unit 204 merges the first grid 712 smaller than the lower limit of a predetermined grange and its common edge first grid 713, and defines the merged grid as a first redrawn grid 712a; meanwhile, the computing unit 204 merges the second grids 722 and 7223 which are corresponded to the first grid 712 and its common edge grid 713, and defines the merged grid as a second redrawn grid 722a.

Further, in the Step S217, the computing unit 204 determines whether the grid merging sub-algorithm S115 for all first grids is finished, and if it is, the computing unit 204 ends the grid merging sub-algorithm S115, on the other hand, if it's not, it proceeds to the Step S218 that automatically starts the next analysis of the first grid 712.

Please refer to FIG. 7C, in the Step S218, the computing unit 204 computes based on the first redrawn grid 712a generated from the Step S216 and determines whether there is a common edge first grid 714. If there is not, it repeats the Step S211 again, and if there is, it further proceeds to the Step S219.

In the Step S219, the computing unit 204 further computes for the first redrawn grid 712a and its common edge first grid 714. The computing unit 204 computes an angle ∠θ (shown as ∠θ in FIG. three-dimension) between the normal vector of the first redrawn grid 712a (shown as the normal vector 312 in FIG. 3B) and the normal vector of the second redrawn grid (shown as the normal vector 322 in FIG. 3C), and another angle ∠θ between the normal vector of the first grid 714 having common edge with the first redrawn grid 712a and the normal vector of the second grid 724.

After finishing the computation for the two angles ∠θ, as the Step S215, the computing unit 204, in the Step S220, further determines whether the two angles are smaller than the lower limit of a predetermined range. If they are, it proceeds to the Step S221, but if they are not, it proceeds to the Step S211 for the analysis of the next first grid.

In the Step S221, the computing unit 204 merges the first redrawn grid 712a smaller than the lower limit of the predetermined range and its common edge first grid 714, and redefines the merged grid as a new first redrawn grid (not illustrated); meanwhile the computing unit 204 merges the first redrawn grid 712a and the second redrawn grid 722a corresponds to the first grid 714, and redefines the new merged grid as a new second redrawn grid 722a. After that, it proceeds to the Step S217 until the grid merging sub-algorithm S115 is finished.

Figure 8:
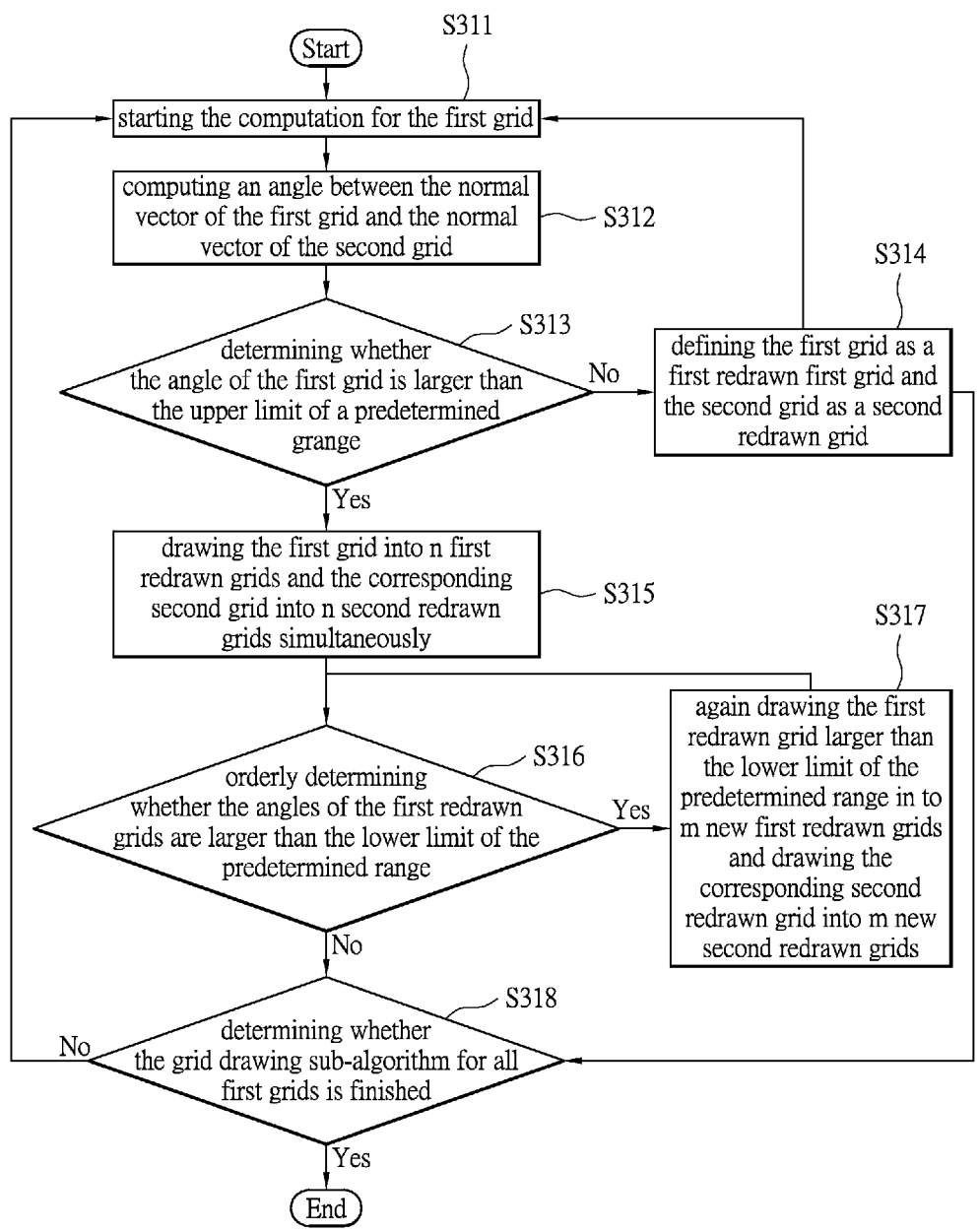
FIG. 8 shows a flow chart of a grid drawing sub-algorithm of an image processing method according to an embodiment of the present disclosure.

Please refer to FIG. 8, FIG. 8 shows a flow chart of a grid drawing sub-algorithm of an image processing method according to an embodiment of the present disclosure. To be more detailed, according to the image processing method of one embodiment of the present disclosure, after finishing the grid adaption program S113, it's able to choose to implement the grid drawing sub-algorithm S114, wherein the grid drawing sub-algorithm S114 further comprises a plurality of steps S311~S318 for determination.

Figure 9:
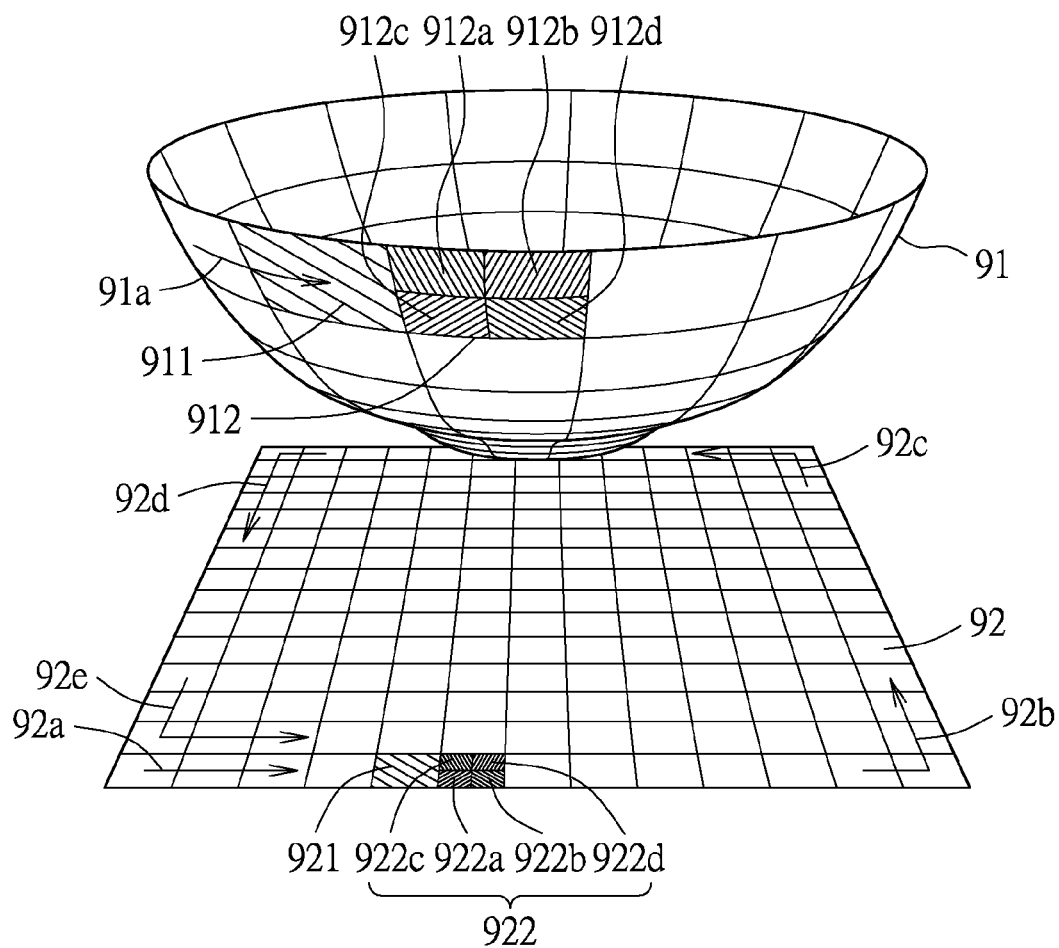
FIG. 9 shows a schematic diagram of a grid drawing sub-algorithm in an image processing method according to an embodiment of the present disclosure.

Please refer to both FIG. 8 and FIG. 9, FIG. 9 shows a schematic diagram of a grid drawing sub-algorithm of an image processing method according to an embodiment of the present disclosure. The first grids 911 and 912 of the three-dimension projected curved surface are respectively corresponded to the second grids 921 and 922 of the two-dimension planar image 92. In the Step S311, the computing unit 204 starts the computation for the grid merging from the three-dimension projected curved surface 91, but in practice, the computing unit 204 is able to starts the computation for the grid merging from the two-dimension planar image 92, and it's not restricted thereto by the present disclosure. In one embodiment of the present disclosure, the computation implemented by the computing unit 204 is via scanning spirally from the inside grids to the outside grids of the grids of the three-dimension projected curved surface. Additionally, it's also able to scan longitudinally or transversely in order. For example, FIG. 9 shows the computation starts from the most outer first grid 911 toward the first grid 912. More precisely, the spirally scanning starts along the corresponding directions 92a~92e, from the outside grids to the inside grids, and from the first grid 911.

In the Step S312, the computing unit 204 computes for the first grid 911 of the three-dimension projected curved surface 91 toward to the direction 91a in order. Further, it proceeds to the Step S312. In the Step S312, the computing unit 204 computes for an angle ∠θ (shown as ∠θ in FIG. 3D) between the normal vector of the first grid 911 (shown as the normal vector 312 in FIG. 3B) and the normal vector of the second grid (shown as the normal vector 322 in FIG. 3C).

In the Step S313, the computing unit 204 further determines whether the angle ∠θ is satisfied with a predetermined condition. The predetermined condition is being larger than the upper limit of a predetermined range, for example, a predetermined range is 30°~60°. To be more detailed, if the angle ∠θ is larger than the upper limit of the predetermined range, and it proceeds to the Step S315, but if the angle ∠θ is not larger than the upper limit, it proceeds to the Step S314. In other words, if the angle ∠θ is within the predetermined range or smaller than the lower limit of the predetermined range, and the computing unit 204 does not implement the grid merging sub-algorithm. It's worth mentioning that the predetermined condition is able to be a predetermined value, such as a real value 45°, and the computing unit 204 determines whether the two angles ∠θ are both larger than 45°, and if they are, it proceeds to the Step S315, and if they are not, it proceeds to the Step S314.

In the Step S314, the computing unit 204 defines the first grid 911 not larger than the upper limit of the predetermined range as a first redrawn grid; meanwhile the computing unit 204 defines the second grid 921 as a second redrawn grid, and proceeds to the Step S318. In one embodiment of the present disclosure, in FIG. 9, after finishing the computation, the first grid 911 becomes a first redrawn grid and the second grid 921 becomes a second redrawn grid.

Please again refer to FIG. 9, in the Step S315, as the first grid computed by the computing unit 204 is larger than the upper limit of a predetermined range, the computing unit 204 draws the first grid into four first redrawn grids 912a~912d, and also correspondingly draws the second grid 922 into four second redrawn grids 922a~922d. In one embodiment of the present disclosure, it merely describes to draw the above grids into four redrawn grids; however, the skilled in the art will use for making an equivalent change to the present disclosure, that is, to draw the above grids into other amount of redrawn grids and it's not restricted thereto by the present disclosure.

After drawing the first grid 912, in the Step S316, the computing unit 204 further determines whether the angles between the vectors of the four first redrawn grids 912a~912d and the corresponding four second redrawn grids 922a~922d are still larger than the upper limit of the predetermined range. If they are, it proceeds to the Step S317, and if they are not, it proceeds to the Step S318.

In the Step S317, the computing unit 204 computes for the first redrawn grids 912a~912d larger than the upper limit of the predetermined range and again draws them into new first redrawn grids (not illustrated), and also draws the corresponding second redrawn grids 922a~922d into new second redrawn grids. After that, the computing unit 204 proceeds to the Step S316 to determine whether the predetermined condition is satisfied. For example, if the first redrawn grids 912a~912d are all satisfied with the predetermined condition, and they are again respectively redrawn into four new first redrawn grids, that is, new 4×4 first redrawn grids.

In the Step S318, the computing unit 204 determines whether the grid drawing sub-algorithm S114 for all first grids is finished. If it is, the grid drawing sub-algorithm S114 is ended, but if it is not, it further repeats the Step S311 and implements the computation for the next first grid 912.

After finishing the grid merging sub-algorithm S115 or the grid drawing sub-algorithm S114, the computing unit 204 provides the computed image results for the projective transformation unit 203 in order to further proceed to the imaging program S116. In the imaging program S116, the projective transformation unit 203 projects the second redrawn grids of the two-dimension planar image onto the first redrawn grids of the three-dimension projected curved surface, and then generates a three-dimension image.

Please again refer to FIG. 3B and FIG. 3C, for example, the second grids of the two-dimension planar image are projected onto the first grids of the three-dimension projected curved surface, wherein for instance the projection is to correspond the four vertexes 321a~321d of the second grid 321 to the four vertexes 311a~311d of the first grid 311, in order to project the image data of the each second grid 321 onto each corresponding first grid 311. Further, the generated three-dimension image is transmitted via a communication unit 201 to a display module 22 to display the three-dimension image for the user and the image processing via the projection from the two-dimension image onto the three-dimension projected curved surface is completed.

Figure 10:
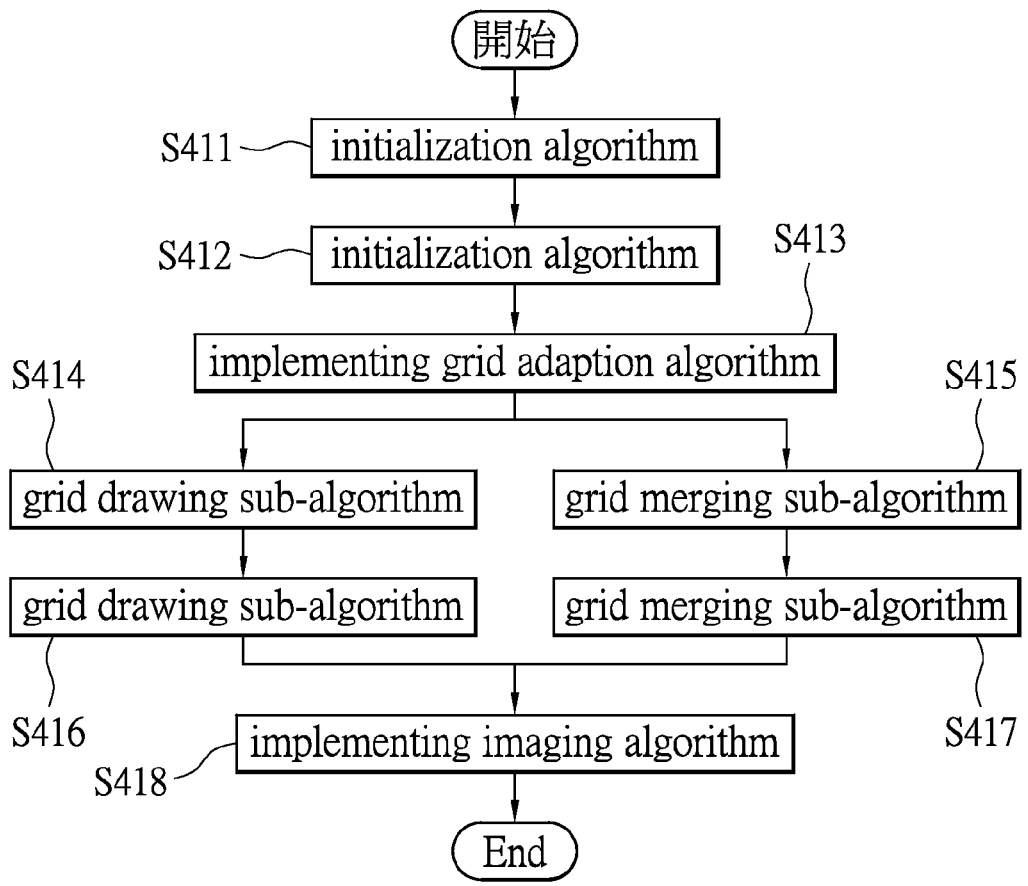
FIG. 10 shows a flow chart of an image processing method according to another embodiment of the present disclosure.

After that, please refer to FIG. 10, FIG. 10 shows a flow chart of an image processing method according to another embodiment of the present disclosure. In the image processing method of another embodiment of the present disclosure, the image processing method comprises the initialization program S411, the gridizing algorithm S412, implementing the grid adaption program S413, the grid drawing sub-algorithm S414 and S417, the grid merging sub-algorithm S415 and S416, and implementing the imaging program S418. The initialization program S411, the gridizing algorithm S412, implementing the grid adaption program S413, the grid drawing sub-algorithm S414 and S417, the grid merging sub-algorithm S415 and S416, and implementing the imaging program S418 are the same as the steps in the image processing method in FIG. 5. In this embodiment of the present disclosure, it differs from the above embodiment that after finishing the grid adaption program S413, there is the grid merging sub-algorithm S416 or the grid drawing sub-algorithm S417 is chosen to be implemented after finishing the grid drawing sub-algorithm S414 or the grid merging sub-algorithm S415. In other words, in the above embodiment, there's merely the grid drawing sub-algorithm S114 or the grid merging sub-algorithm S115 chosen to be implemented; however, in this embodiment of the image processing method, both the grid drawing sub-algorithm and the grid merging sub-algorithm are implemented.

For example, in the image processing method in FIG. 10, after implementing the grid drawing sub-algorithm S414, it further proceeds to the grid merging sub-algorithm S416, or, after implementing the grid merging sub-algorithm S415, it further proceeds to the grid drawing sub-algorithm S417. To be brief, the present disclosure is able to merely implement the grid merging sub-algorithm or the grid drawing sub-algorithm, and also able to implement both of the grid merging sub-algorithm and the grid drawing sub-algorithm. It's more worth mentioning that, the order of the implementation is able to be adjusted by the user, and it's not restricted thereto by the present disclosure.

Accordingly, via the image processing method and system using the same provided by the present disclosure, it's able to dynamically adjust the grid drawing sub-algorithm during the projective transformation process adaptively according to the different used three-dimension projected models regarding to different needs for images, and able to precisely transform a two-dimension image into a three-dimension image, in order to improve the visual effect provided by the prior art and also the time consumption of computing. The image processing method and system using the same provided by the present disclosure is able to replace the prior art via the improved computing process under the current two-dimension image monitoring system framework without changing the current hardware framework or additionally having certain hardware facilities. Also, the present disclosure is able to effectively improve the image distortion of the image monitoring system regarding the vehicle safety, housing security or other surrounding images.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

What is claimed is:

1. An image processing method, comprising:
   (a) capturing a plurality of images corresponding to the surroundings of an object using a plurality of image capturing modules to generate a two-dimension planar image;
   (b) providing a three-dimension projected curved surface, defining a plurality of first grids on the three-dimension projected curved surface and a plurality of second grids on the two-dimension planar image, wherein each of the first grids corresponds to each of the second grids;
   (c) transforming the first grids on the three-dimension projected curved surface and the second grids on the two-dimension planar image into a plurality of first redrawn grids and second redrawn grids respectively based on the angles formed between the normal vector of the two-dimension planar image and the normal vector of each first grid, wherein each first redrawn grid corresponds to each second redrawn grid; and
   (d) projecting an image data of the second redrawn grids onto the first redrawn grids correspondingly to generate a three-dimension image.

2. The image processing method of claim 1, wherein step before the step (c), further comprises:
   selecting one of the three-dimension projected curved surface and the two-dimension planar image to scan, in order to detect the angle between the first normal vector of the two-dimension planar image and the corresponding second normal vector of the first grid.

3. The image processing method of claim 2, wherein the step (c) further comprises:
   respectively computing a first angle and a second angle formed between two second normal vectors of any two first grids and the first normal vector of the two-dimension planar image having common edge;
   determining whether the first angle and the second angle are smaller than a predetermined value; and
   merging two first grids having common edge as the first redrawn grid and merging two corresponding second grids of the two-dimension planar image as the second redrawn grid when the first angle and the second angle are smaller than the predetermined value.

4. The image processing method of claim 2, wherein the step (c) further comprises:
   computing a first angle formed between the second normal vector of the first grid of the three-dimension projected curved surface and the first normal vector of the two-dimension planar image;
   determining whether the first angle is larger than a predetermined value;
   drawing the first grid into a plurality of first redrawn grids and drawing the corresponding second grid of the two-dimension planar image into a plurality of second redrawn grids when the first angle is larger than the predetermined value.

5. The image processing method of claim 2, wherein step (c) further comprises:
   respectively computing a first angle and a second angle formed between two second normal vectors of any two first grids having common edge and the first normal vector of the two-dimension planar image;
   determining whether the first angle and the second angle are within a predetermined range; and
   defining the first grid as the first redrawn grid and also defining the corresponding second grid when the second redrawn grid, when the first angle and the second angle are within the predetermined range.

6. The image processing method of claim 5, wherein the step (c) further comprises:
   merging the first grids having common edge into the first redrawn grid and merging the corresponding two second grids of the two-dimension planar image into the second redrawn grid when the first angle and the second angle are smaller than a lower limit of the predetermined range.

7. The image processing method of claim 5, wherein the step (c) further comprises:
   drawing the first grid into a plurality of first redrawn grids and drawing the corresponding second grid of the two-dimension planar image into a plurality of second redrawn grids when the first angle is determined to be larger than the upper limit of the predetermined range.

8. The image processing method of claim 2, wherein the step (c) further comprises:
   scanning spirally from the inside grids to the outside grids of the first grids or the second grids in the center of the three-dimension projected curved surface or the two-dimension planar image which is selected.

9. The image processing method of claim 1, wherein the three-dimension projected surface is a closed concave curved surface.

10. The image processing method of claim 1, wherein the step (c) further comprises:
    projecting four vertexes of each first redrawn grid corresponding with four vertexes of each second redrawn grid.

11. A system applying the image processing method, comprising:
    a plurality of image capturing modules, for capturing a plurality of images of the surroundings of an object;
    an image processing module, for transforming an image data with the image capturing modules, the image processing module comprising:
        an image reconstruction unit, coupled to the image capturing modules and receiving the images, for generating a two-dimension planar image;
        a computing unit, coupled to the image reconstruction unit, for respectively and correspondingly drawing a three-dimension projected curved surface and the two-dimension planar image into a plurality of first girds and a plurality of second grids and each second grid corresponds to each first grid, and drawing the three-dimension projected surface and the first grids and the second grids of the two-dimension planar image into a plurality of first redrawn grids and a plurality of second redrawn grid, according to an angle between a first normal vector of the two-dimension planar image and a second normal vector of each first grid and each first redrawn grid corresponds to each second redrawn grid; and
        a projective transformation unit, coupled to the computing unit, to correspondingly project the image data in the second redrawn grids onto the first redrawn grids to generate a three-dimension image.

12. The system applying the image processing method of claim 11, wherein the computing unit selects one of the three-dimension projected surface and the two-dimension planar image to scan in order to detect the angle between the first normal vector of the two-dimension planar image and the second normal vector of the corresponding first grid.

13. The system applying the image processing method of claim 12, wherein the computing unit respectively computes a first angle and a second angle formed between two second normal vectors of any two first grids having common edge and the first normal vector of the two-dimension planar image; the computing unit merges the two first grids having common edge into the first redrawn grid and merges two corresponding second grids of the two-dimension planar image into the second redrawn grid, when the computing unit determines that the first angle and the second angle are smaller than a predetermined value.

14. The system applying the image processing method of claim 12, wherein the computing unit computes a first angle between the second normal vector of the first grid of the three-dimension projected curved surface and the first normal vector of the two-dimension planar image; the computing unit draws the first grid into a plurality of first redrawn grids and draws the corresponding second grid of the two-dimension planar image into a plurality of second redrawn grids, when the computing unit determines that the first angle is larger than a predetermined value.

15. The system applying the image processing method of claim 12, wherein the computing unit respectively computes a first angle and a second angle formed between two second normal vectors of any two first grids having common edge and the first normal vector of the two-dimension planar image; the computing unit defines the first grid as the first redrawn grid and defines the corresponding second grid as the second redrawn grid when the computing unit determines that the first angle and the second angle are within a predetermined range.

16. The system applying the image processing method of claim 15, wherein the computing unit merges the two first grids having common edge into the first redrawn grid and merges the corresponding two second grids of the two-dimension planar image into the second redrawn grid, when the computing unit determines that the first angle and the second angle are smaller than a lower limit of the predetermined range.

17. The system applying the image processing method of claim 15, wherein the computing unit draws the first grid into a plurality of first redrawn grids and draws the corresponding second grid of the two-dimension planar image into a plurality of second redrawn grids, when the computing unit determines that the first angle is larger than the upper limit of the predetermined range.

18. The system applying the image processing method of claim 12, wherein the computing unit scans spirally from the inside grids to the outside grids of the first grids or the second grids in the center of the three-dimension projected curved surface or the two-dimension planar image which is selected.

19. The system applying the image processing method of claim 11, wherein the three-dimension projected curved surface is a closed concave curved surface.

20. The system applying the image processing method of claim 11, wherein the computing unit projects more than one vertex of each first redrawn grid correspondingly on more than one vertex of each second redrawn grid.

\* \* \* \* \*